(12) United States Patent
Paul et al.

(10) Patent No.: US 11,780,023 B2
(45) Date of Patent: Oct. 10, 2023

(54) ALUMINUM BORON NITRIDE NANOTUBE COMPOSITES AND METHODS OF MANUFACTURING THE SAME

(71) Applicant: The Florida International University Board of Trustees, Miami, FL (US)

(72) Inventors: Tanaji Paul, Miami, FL (US); Arvind Agarwal, Miami, FL (US); Cheng Zhang, Miami, FL (US); Sohail Mazher Ali Khan Mohammed, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/065,791

(22) Filed: Dec. 14, 2022

(65) Prior Publication Data

US 2023/0182224 A1 Jun. 15, 2023

Related U.S. Application Data

(60) Provisional application No. 63/265,398, filed on Dec. 14, 2021.

(51) Int. Cl.
*B23K 9/04* (2006.01)
*B22F 1/14* (2022.01)
(Continued)

(52) U.S. Cl.
CPC .............. *B23K 9/044* (2013.01); *B22F 1/107* (2022.01); *B22F 1/14* (2022.01); *B33Y 10/00* (2014.12);
(Continued)

(58) Field of Classification Search
None
See application file for complete search history.

(56) References Cited

U.S. PATENT DOCUMENTS

| 10,941,464 B1 | 3/2021 | Agarwal et al. |
| 11,131,007 B1 | 9/2021 | Agarwal et al. |
| (Continued) | | |

FOREIGN PATENT DOCUMENTS

| CN | 102943223 A | * | 2/2013 | ........... C22C 121/02 |
| CN | 111992705 A | * | 11/2020 | ............ B22F 1/0003 |
| WO | WO 2018099774 A1 | * | 6/2018 | ........... C01B 32/172 |

OTHER PUBLICATIONS

"Wire." Wire—Wikipedia, the Free Encyclopedia, Jan. 27, 2011, https://web.archive.org/web/20110127225046/https://en.wikipedia.org/wiki/Wire. (Year: 2011).*

(Continued)

*Primary Examiner* — Dana Ross
*Assistant Examiner* — Kevin Guanhua Wen
(74) *Attorney, Agent, or Firm* — Saliwanchik, Lloyd & Eisenschenk

(57) ABSTRACT

Methods for fabricating high-strength aluminum-boron nitride nanotube (Al—BNNT) wires or wire feedstock from Al—BNNT composite raw materials by mechanical deformation using wire drawing and extrusion are provided, as well as large-scale, high-strength Al—BNNT composite components (e.g., with a length on the order of meters (m) and/or a mass on the order of hundreds of kilograms (kg)). The large-scale, high-strength Al—BNNT composite components can be made via wire-based additive manufacturing.

19 Claims, 12 Drawing Sheets

(51) Int. Cl.
*B22F 1/107* (2022.01)
*B33Y 10/00* (2015.01)
*B33Y 70/10* (2020.01)
B23K 103/10 (2006.01)
B23K 37/02 (2006.01)
B23K 103/16 (2006.01)

(52) U.S. Cl.
CPC .......... *B33Y 70/10* (2020.01); *B23K 37/0229* (2013.01); *B23K 2103/10* (2018.08); *B23K 2103/16* (2018.08)

(56) References Cited

U.S. PATENT DOCUMENTS

| | | | |
|---|---|---|---|
| 11,148,201 | B2 | 10/2021 | Agarwal et al. |
| 2017/0355021 | A1* | 12/2017 | Agarwal et al. .......... B22F 7/02 |
| 2019/0099769 | A1* | 4/2019 | Holverson et al. ....... B05B 5/00 |
| 2020/0324403 | A1* | 10/2020 | Kashikar et al. .......... B25J 9/00 |

OTHER PUBLICATIONS

Machine translation of CN 102943223 A performed on Apr. 12, 2023, Jiao et al. (Year: 2013).*
Machine translation of CN 111992705 A performed on Apr. 12, 2023, Liu et al. (Year: 2020).*
Melania Antillon et al., Strengthening in Boron Nitride Nanotube Reinforced Aluminum Composites Prepared by Roll Bonding, Advanced Engineering Materials, 20, 1800122, 2018, 9 pages.
Pranjal Nautiyal et al., Reactive wetting and filling of boron nitride nanotubes by molten aluminum during equilibrium solidification, aCTA mATERIALIA 126, pp. 124-131, 2017, 8 pages.
Pranjal Nautiyal et al., Directionally Aligned Ultra-Long Boron Nitride Nanotube Induced Strengthening of Aluminum-Based Sandwich Composite, Advanced Engineering Materials, 18, No. 10, 2016, 9 pages.
Nicole Bacca et al., Tribological and neutron radiation properties of boron nitride nanotubes reinforced titanium composites under lunar environment, Journal of Materials Research, vol. 37, Issue 24, 2022, 12 pages.
Geir Langelandsvik et al., Development of Al-TiC Wire Feedstock for Additive Manufacturing by Metal Screw Extrusion, Metals 2020, 10, 1485, 17 pages.
K. S. Derekar, A review of wire arc additive manufacturing and advances in wire arc additive manufacturing of aluminium, Materials Science and Technology, vol. 34, No. 8, pp. 895-916, 2018, 23 pages.
Zhu Liang et al., Characteristics of metal droplet transfer in wire-arc additive manufacturing of aluminum alloy, The International Journal of Advanced Manufacturing Technology, 2018, 99:1521-1530, 10 pages.

* cited by examiner

ALUMINUM BORON NITRIDE NANOTUBE COMPOSITES AND METHODS OF MANUFACTURING THE SAME

CROSS-REFERENCE TO RELATED APPLICATION

This application claims the benefit of U.S. Provisional Application Ser. No. 63/265,398, filed Dec. 14, 2021, the disclosure of which is hereby incorporated by reference in its entirely, including all figures, tables, and drawings.

GOVERNMENT SUPPORT

This invention was made with government support under W911NF-20-2-0256 awarded by the Army Research Laboratory. The government has certain rights in the invention.

BACKGROUND

The aerospace and automotive industries employ structural components such as rockets and chassis that must bear high loads while simultaneously having low fuel consumption. This requires metallic parts that have high strength and are lightweight. Aluminum, magnesium, and titanium are typically used due to their high strength-to-weight ratio.

BRIEF SUMMARY

Embodiments of the subject invention provide novel and advantageous methods for fabricating high-strength aluminum-boron nitride nanotube (Al—BNNT) wires or wire feedstock from Al—BNNT composite raw materials by mechanical deformation using wire drawing and extrusion, as well as large-scale, high-strength Al—BNNT composite components (e.g., with a length on the order of meters (m) and/or a mass on the order of hundreds of kilograms (kg)). The large-scale, high-strength Al—BNNT composite components can be made via, e.g., wire arc-based additive manufacturing (WAAM). Embodiments also provide methods of synthesizing Al—BNNT composite raw materials using casting and ultrasound, in which the matrix can be, for example, pure Al (e.g., commercially pure Al), Al wrought alloys, or Al high entropy alloys (Al-HEAs).

In an embodiment, a method for fabricating an Al—BNNT composite can comprise: preparing an Al—BNNT ingot including ultrasonically treating a mixture of Al and BNNTs; performing an extrusion and drawing process on the Al—BNNT ingot to form an Al—BNNT wire; and forming the Al—BNNT composite via a WAAM process using the Al—BNNT wire as a feedstock for a wire-arc additive manufacturing (WAAM) system. The WAAM system can comprise a nozzle attached to a robotic arm. The robotic arm can be configured to move along or rotate about a number of axes (e.g., at least 3, 4, 5, 6, 7, 8, 9, or 10 axes). The preparing of the Al—BNNT ingot can comprise ultrasonically treating the mixture of Al and BNNTs to form an Al—BNNT powder, compacting (e.g., cold compacting) the Al—BNNT powder into Al—BNNT pellets, melting the Al—BNNT pellets (optionally together with more Al (e.g., pure Al or Al alloy)) to form a melted block, and then cooling the melted block to form the Al—BNNT ingot. The WAAM process can comprise controlling travel speed in a range of from 5 millimeters per second (mm/s) to 30 mm/s, controlling arc voltage in a range of from 10 Volts (V) to 30 V, and/or controlling arc current in a range of from 70 Amperes (A) to 240 A using the WAAM system. The extrusion and drawing process can comprise pushing the Al—BNNT ingot through a plurality of dies of progressively smaller diameters to successively decrease a diameter of the Al—BNNT ingot. The method can further comprise performing a rolling process on the Al—BNNT ingot before performing the extrusion and drawing process. The rolling process can comprise passing the Al—BNNT ingot through a pair of rolling mills at least once to decrease a thickness of the Al—BNNT ingot. The mixture of Al and BNNTs can comprise an Al-containing powder (e.g., pure Al powder or Al alloy powder) and BNNTs in a solvent (e.g., an alcohol). The Al-containing powder can comprise an Al alloy.

In another embodiment, an Al—BNNT composite can have a length of at least 1 m and/or a mass of at least 100 kg while being a single, monolithic structure. That is, the Al—BNNT composite (exclusive of any attached structures or materials that may be present) has a length of at least 1 m (e.g., at least 2 m, at least 3 m, at least 4 m, at least 5 m, at least 6 m, at least 7 m at least 8 m, at least 9 m, or at least 10 m) and/or a mass of at least 100 kg (e.g., at least 200 kg, at least 300 kg, at least 400 kg, at least 500 kg, at least 600 kg, at least 700 kg, at least 800 kg, at least 900 kg, or at least 1000 kg). The Al—BNNT composite can be free of any fasteners. The Al—BNNT composite (exclusive of any attached structures or materials that may be present) can have a thickness of, for example, at least 10 centimeters (cm) (e.g., at least 20 cm, at least 30 cm, at least 40 cm, at least 50 cm, at least 60 cm, at least 70 cm, at least 80 cm, at least 90 cm, at least 1 m, at least 1.5 m, or at least 2 m). The Al—BNNT composite (exclusive of any attached structures or materials that may be present) can have a width of, for example, at least 10 cm (e.g., at least 20 cm, at least 30 cm, at least 40 cm, at least 50 cm, at least 60 cm, at least 70 cm, at least 80 cm, at least 90 cm, at least 1 m, at least 1.5 m, at least 2 m, at least 3 m, at least 4 m, at least 5 m, at least 6 m, at least 7 m, at least 8 m, at least 9 m, or at least 10 m). The Al—BNNT composite can be fabricated by a method as disclosed herein.

BRIEF DESCRIPTION OF DRAWINGS

FIG. 5 shows a robot with freedom of motion about multiple axes for fabricating large parts with complex geometries (e.g., with a length on the order of meters and/or a mass on the order of hundreds of kilograms).

FIG. 8 shows certain dimensions, temperatures, and pressures, these are for exemplary purposes only and should not be construed as limiting.

FIG. 10A shows beads, with FIG. 10B showing a close-up version of FIG. 10A. FIG. 10C shows additive deposited tracks, with FIG. 10D showing a close-up version of FIG. 10C.

FIG. 11A shows beads of the composite deposited. FIG. 11B shows an enlarged version of the box in FIG. 11A; the scale bar is 50 micrometers (µm). FIG. 11C shows an enlarged version of the box in FIG. 11B; the scale bar is 10 µm. FIG. 11F shows an enlarged version of the box in FIG. 11C; the scale bar is 5 µm. FIG. 11E shows an enlarged version of the box in FIG. 11F, with BNNTs, oxide layers, and the melt pool labeled; the scale bar is 1 µm. FIG. 11D shows an SEM image of a different portion of the composite; the scale bar is 1 µm. FIG. 11G shows an enlarged version of a portion of FIG. 11D, showing BNNTs uniformly dispersed in the Al; the scale bar is 0.5 µm. FIG. 11H shows an enlarged version of a portion of FIG. 11G, with BNNTs wrapped in Al identified by the arrows; the scale bar is 100 nanometers (nm). FIG. 11I shows an enlarged version of a different portion of FIG. 11G, with the existence of a BNNT strand identified by the arrow; the scale bar is 100 nm.

FIG. 12A shows an Al melt pool; the scale bar is 10 µm. FIG. 12B shows an enlarged version of the box in FIG. 12A, with the Al melt pool identified with arrows; the scale bar is 1 µm. FIG. 12C shows an enlarged version of a portion of FIG. 12A, where the Al melt pool can be seen; the scale bar is 1 µm. FIG. 12D shows a duplicate of the image in FIG. 12C, but with the oxide layer identified with the arrow near the top-left of the image and BNNTs identified with the remaining arrows (and the Al melt pool identified with the label). FIG. 12E shows an enlarged version of FIGS. 12C and 12D, with BNNTs wrapped in Al identified with the arrows.

DETAILED DESCRIPTION

Embodiments of the subject invention provide novel and advantageous methods for fabricating high-strength aluminum-boron nitride nanotube (Al—BNNT) wires or wire feedstock from Al—BNNT composite raw materials by mechanical deformation using rolling and/or wire drawing and extrusion, as well as large-scale, high-strength Al—BNNT composite components (e.g., with a length on the order of meters (m) and/or a mass on the order of hundreds of kilograms (kg)). The large-scale, high-strength Al—BNNT composite components can be made via, e.g., wire arc-based additive manufacturing (WAAM). Embodiments also provide methods of synthesizing Al—BNNT composite raw materials using casting and ultrasound, in which the matrix can be, for example, pure Al (e.g., commercially pure Al), Al wrought alloys, or Al high entropy alloys (Al-HEAs).

No related art technology can manufacture large-scale, high-strength Al—BNNT composite components by wire-based processing techniques. Embodiments of the subject invention can synthesize Al—BNNT raw materials by ultrasonic casting, thereby enhancing their strength beyond commercial aluminum 6061 (Al 6061) and aluminum 7075 (Al 7075). High-strength Al—BNNT wire feedstock can be produced from these raw materials by rolling that decreases the thickness of the wire (e.g., successively decreases the thickness over multiple rolls) and/or wire drawing and extrusion that decreases the diameter of the wire (e.g., successively decreases the diameter of the wire over multiple draws). The feedstock can be used to manufacture large-sized Al—BNNT composite components via single-step WAAM. Embodiments can therefore circumvent the need for time- and cost-intensive assembly of multiple parts, while also inhibiting or eliminating weak links (e.g., bolts, brazed joints, and/or soldered joints) thereby preserving the original high strength of the pristine Al—BNNT feedstock wire in the manufactured component.

Figure 1:
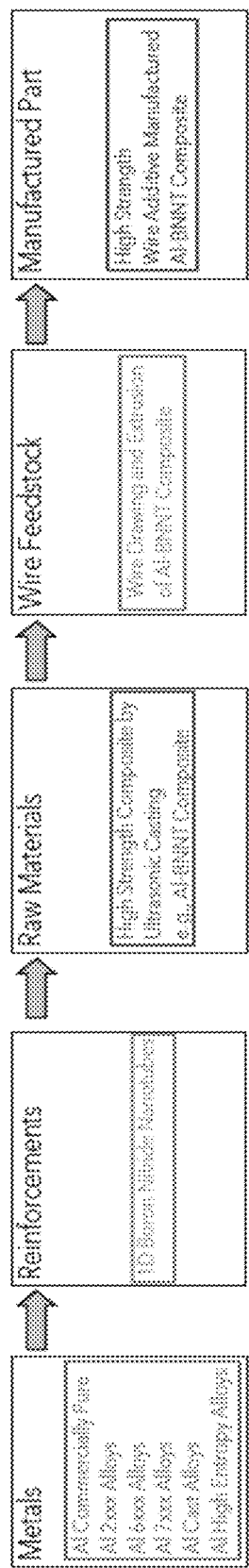
FIG. 1 shows a material, system, and process flow for fabrication of wire feedstock and large parts of aluminum-boron nitride nanotube (Al—BNNT) composites by wire arc-based additive manufacturing (WAAM), according to an embodiment of the subject invention.
Figure 2:
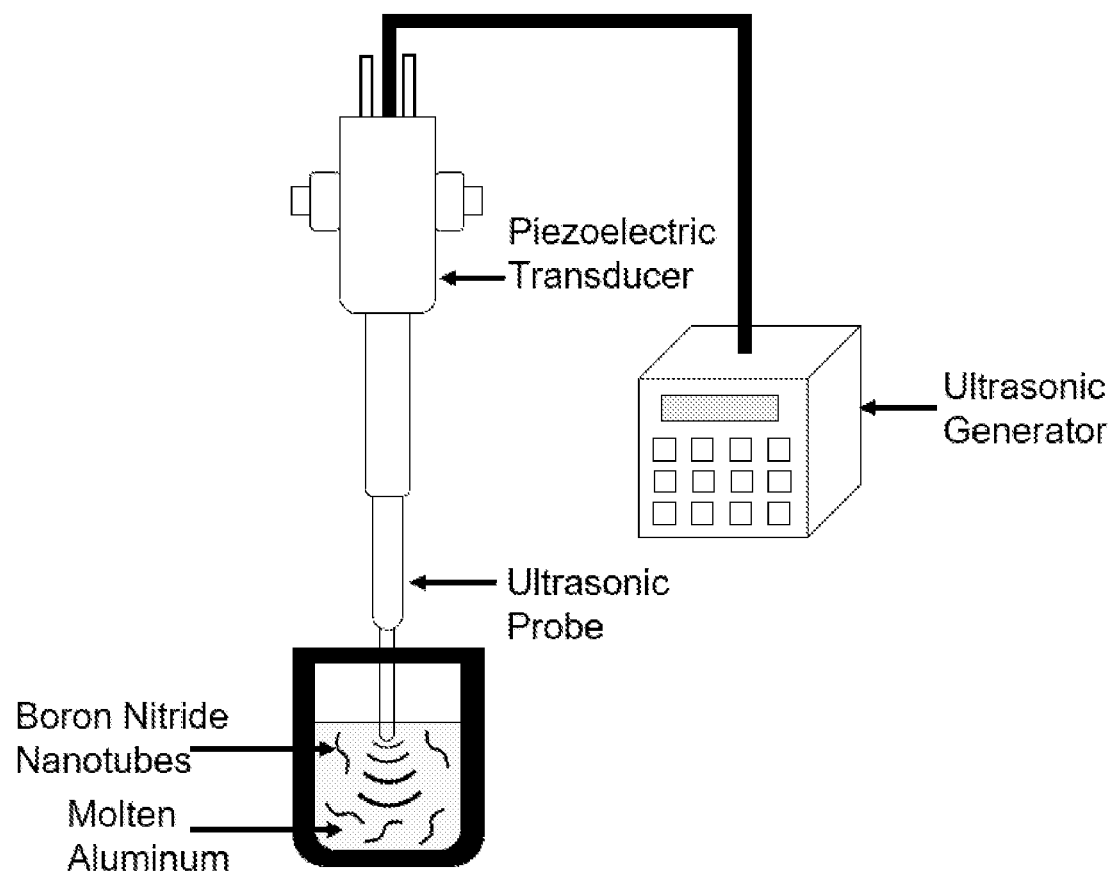
FIG. 2 shows a device that can be used for synthesis of Al—BNNT raw material by ultrasonic casting, according to an embodiment of the subject invention.
Figure 6:
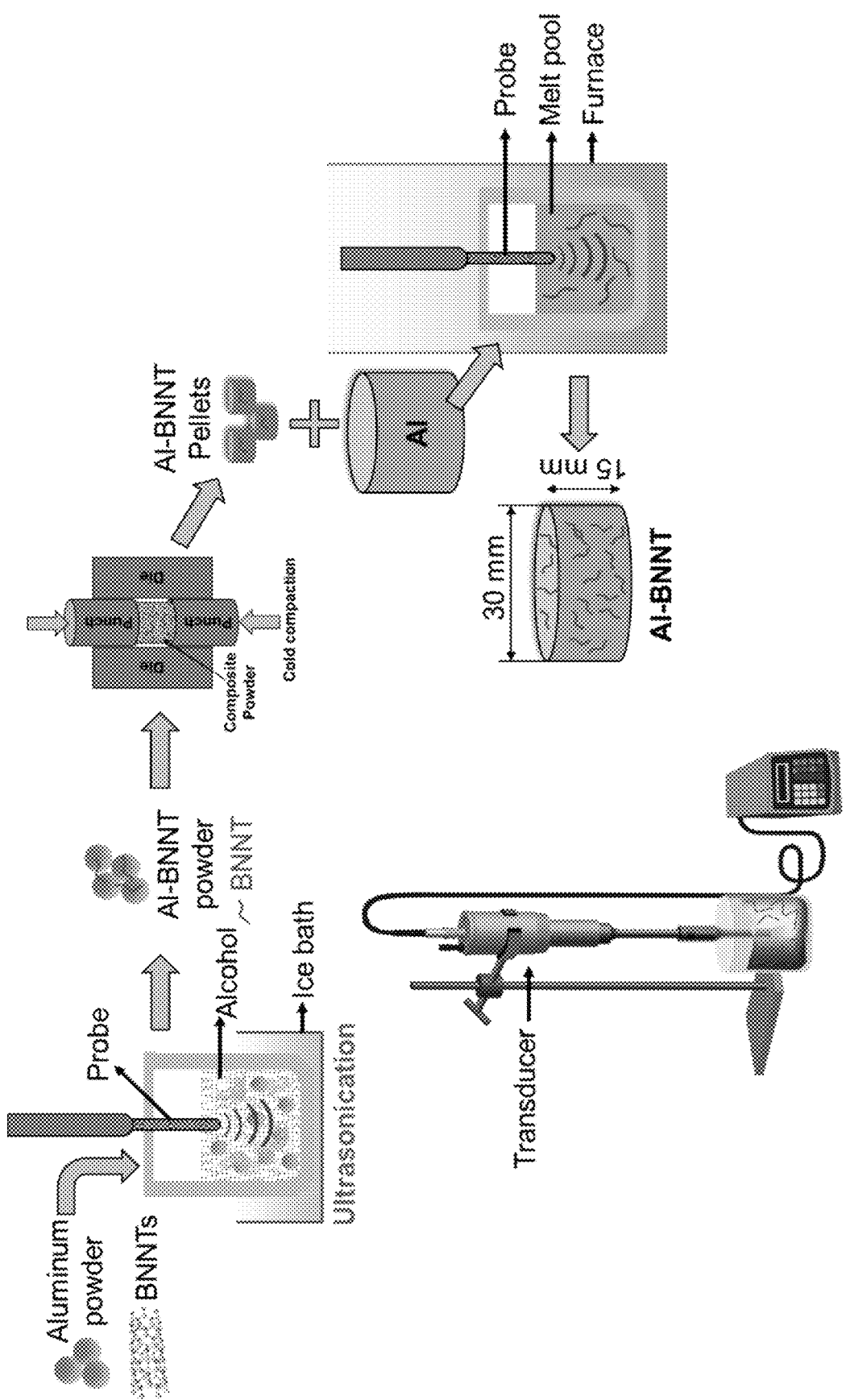
FIG. 6 shows a flow diagram of a method for fabricating high-strength Al—BNNT composite raw materials by a combination of powder compaction and ultrasound assisted casting, according to an embodiment of the subject invention.

FIG. 1 shows a material, system, and process flow for fabrication of wire feedstock and large parts of Al—BNNT composites by WAAM, according to an embodiment of the subject invention. Referring to FIG. 1, large-scale, high-strength Al—BNNT composite components can be manufactured by WAAM. Aluminum composite raw materials (e.g., with a matrix of commercially pure Al, Al wrought alloy, or Al-HEA) can be synthesized by ultrasonic casting. FIG. 2 shows a device that can be used for such a synthesis via ultrasonic casting. FIG. 6 shows the device (bottom-left corner), along with a flow diagram of a method for fabricating high-strength Al—BNNT composite raw materials by a combination of powder compaction and ultrasound assisted casting, according to an embodiment of the subject invention. High-strength Al—BNNT wire feedstock can be manufactured while preserving the homogenous dispersion of BNNTs by mechanical rolling and/or mechanical wire drawing and extrusion. A single-step WAAM technique can be used to deposit the wire as a large-scale monolithic Al—BNNT component without the need for any assembly or fastenings, thereby saving workforce, time, and expenditure. The avoidance of fastenings (e.g., bolts, brazed joints, and/or soldered joints) also increases the strength of the wire while eliminating weak links.

Figure 7:
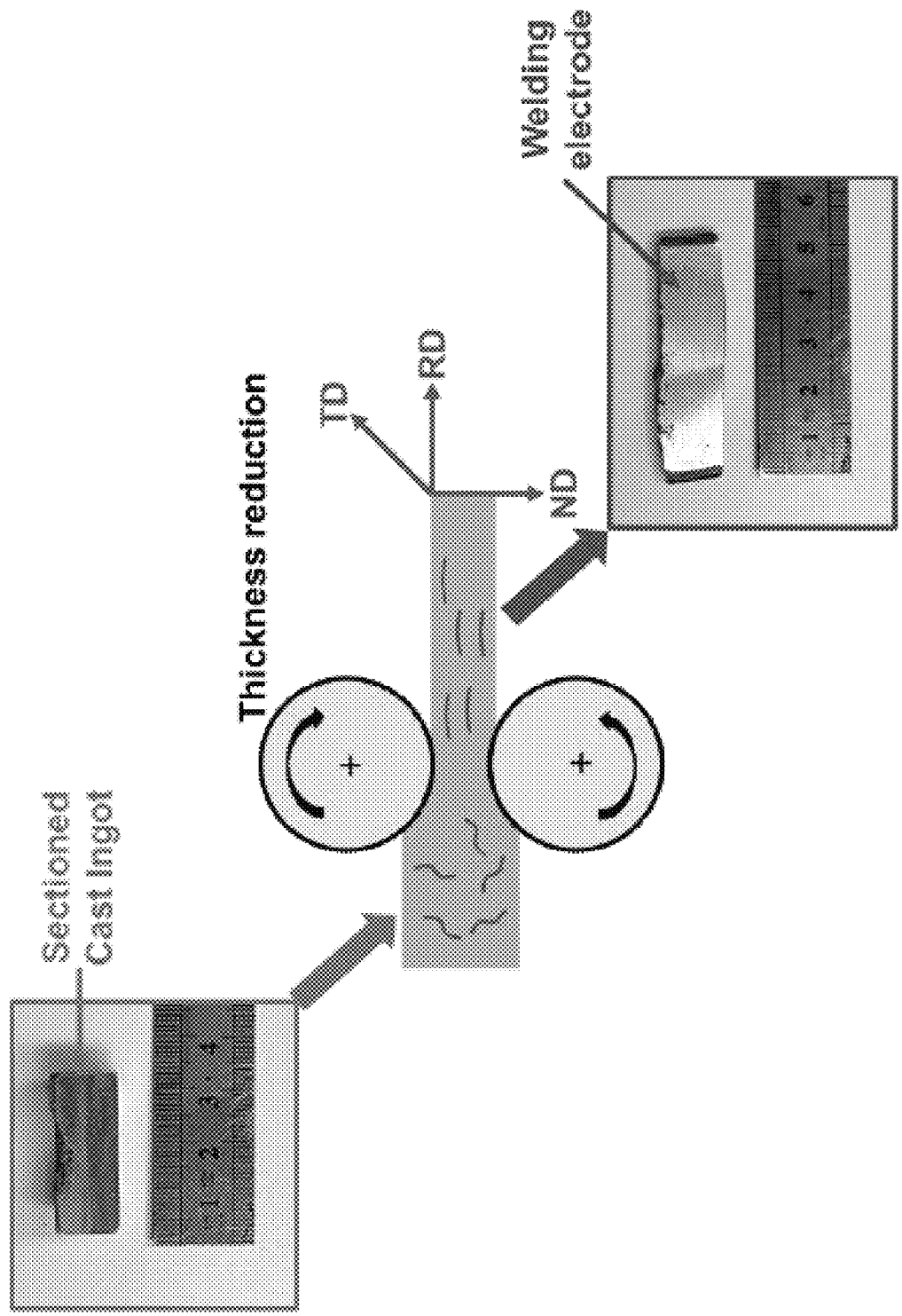
FIG. 7 shows a flow diagram of a method of fabricating high-strength Al—BNNT electrode feedstock by a rolling technique, according to an embodiment of the subject invention. The thickness of the electrode can be successively reduced to a desired thickness by multiple passes between the rolling mills (labeled with the "+").

High-strength Al—BNNT raw materials (e.g., cpAl—BNNT, Al—BNNT, Al-HEA-BNNT) can be synthesized using ultrasound and casting techniques. High-strength wire feedstock of Al—BNNT composites can be achieved by successively decreasing the diameter of cast ingots using wire drawing and extrusion (see, e.g., FIGS. 3 and 8). The feedstock can alternatively be obtained via rolling (see, e.g., FIG. 7), or it can be rolled in addition to the drawing and extrusion (e.g., before the drawing and extrusion). High strength structural components of Al—BNNT composites with large sizes (e.g., a length on the order of a few m and/or a mass on the order of a few hundred kg) can be fabricated by WAAM. The single-step manufacturing technology saves time and work/resource expenditure. The structure and high strength characteristics of the Al—BNNT composite wire feedstock can be preserved in the component by eliminating the need for assembly of parts and weak links such as bolting, brazing, and/or soldering.

Figure 4:
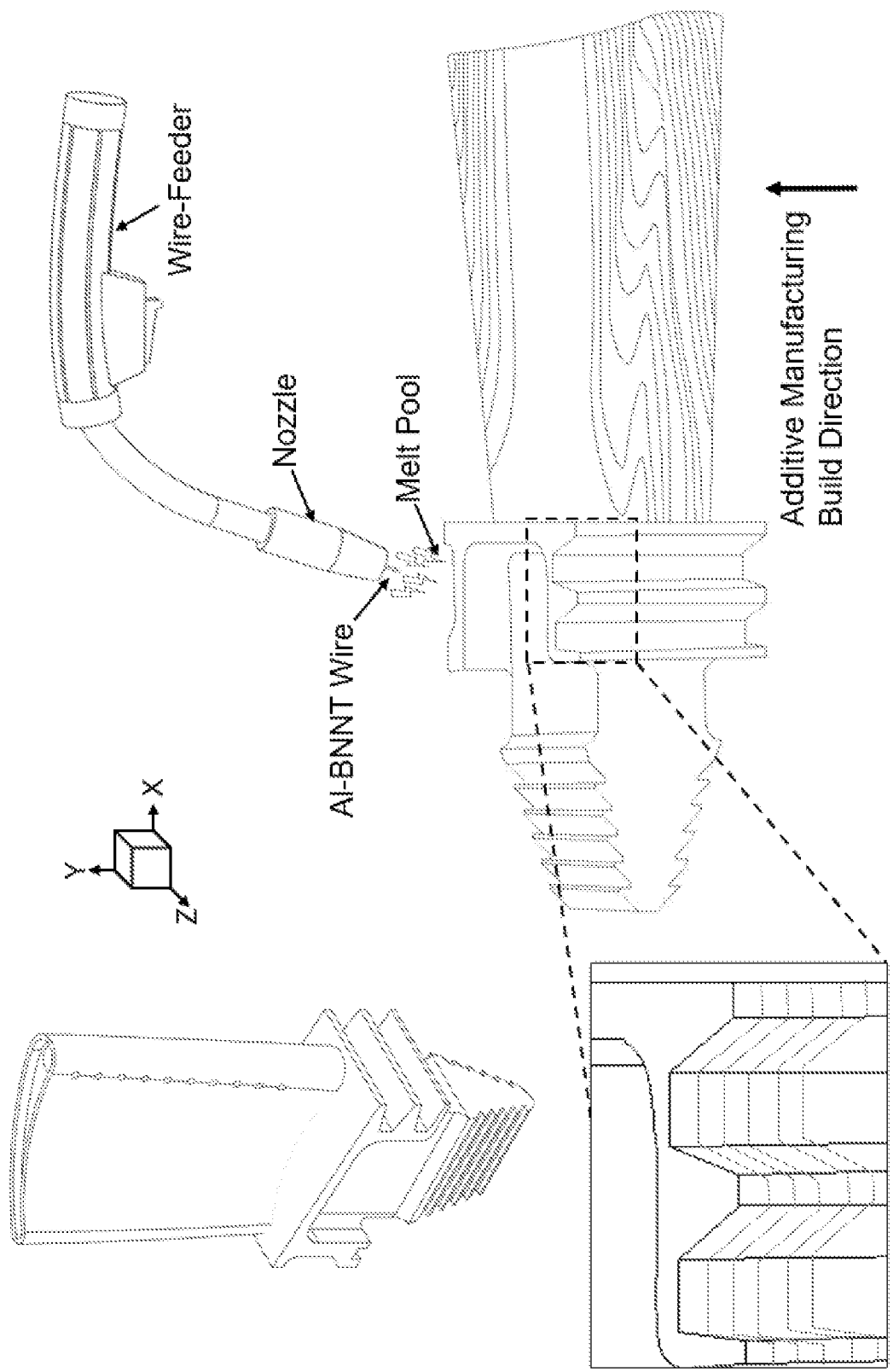
FIG. 4 shows a schematic view of WAAM of high-strength large-size Al—BNNT composites, according to an embodiment of the subject invention.
Figure 9:
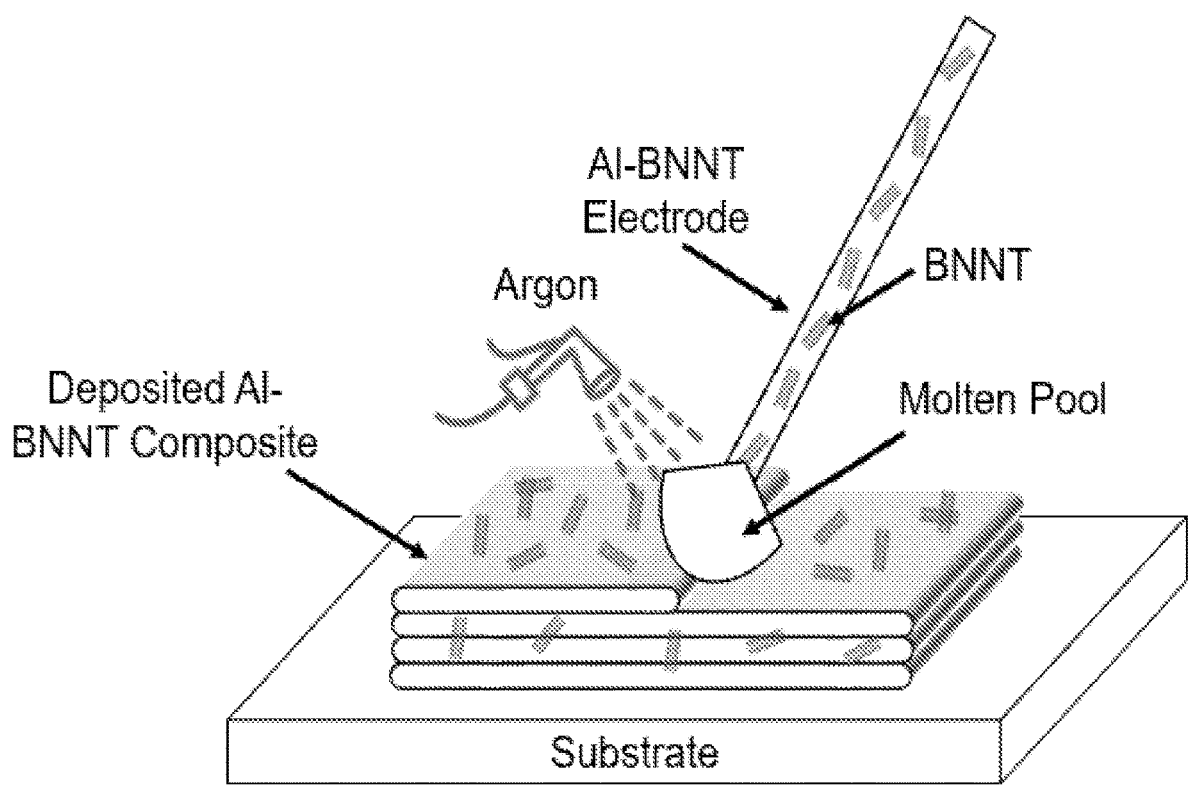
FIG. 9 shows an image of WAAM of high-strength large-size Al—BNNT composites, according to an embodiment of the subject invention, using electrode feedstock (and by controlling process parameters). Though FIG. 9 lists argon as the gas from the gas supply, this is for exemplary purposes only and should not be construed as limiting.

Aerospace and automotive industries employ structural components such as rockets and chassis that must bear high loads while simultaneously having low fuel consumption. This requires metallic parts that have high strength and are lightweight. Aluminum, magnesium, and titanium are typically the metals of choice due to their high strength-to-weight ratio. This can be improved using BNNTs with high strength (about 61 gigaPascals (GPa)) and low density (0.3-2.0 grams per cubic centimeter ($g/cm^3$)). These composites need to be manufactured as large parts (e.g., on the scale of fuselage and cars) in order to be used in the aerospace and automotive industries. WAAM of embodiments of the subject invention can fabricate high-strength composite parts with complex geometries. FIG. 4 shows a schematic view of WAAM of high-strength large-size Al—BNNT composites, according to an embodiment of the subject invention. FIG. 9 shows an image of WAAM of high-strength large-size Al—BNNT composites, according to an embodiment of the subject invention, using electrode feedstock (and by controlling process parameters).

Embodiments of the subject invention can achieve synthesis of high-strength raw materials for rolling and/or wire extrusion from Al—BNNT composites. Conventional and high entropy alloys can first be melted, and BNNTs can be incorporated with them using ultrasonic casting (see also FIGS. 2 and 6). Ultrasonic waves homogeneously disperse and integrate BNNTs within the matrix. Consequently, the strength of these composites surpasses those of commercially available aluminum alloys (e.g., Al 6061, Al 7075, etc.). High-strength Al—BNNT composite wire feedstock can be fabricated. Ultrasonic cast Al—BNNT composite ingots can be mechanically formed into high-strength wire feedstock by wire drawing and extrusion (see also FIGS. 3 and 8). This mechanical working step can utilize a die made of a hard material (e.g., tungsten, tool steel, or tungsten carbide). The diameter of the output side of the die is smaller than that of the input side. The cylindrical ultrasonic cast ingot is pushed from the input side (e.g., using a ram) and exits with a smaller diameter on the output side. This process can be repeated multiple times (with dies of successively smaller diameters) to obtain a wire of the required diameter. The temperature of the Al—BNNT cast ingot remains below the melting point during the drawing and extrusion, and consequently the homogeneous dispersion of BNNTs and their integration with Al are preserved. Further, wires have less specific surface area than powder that restricts metal oxidation and moisture uptake and simplifies handling and storage. The drawn or extruded Al—BNNT composite wire thus exhibits high strength. The feedstock can first (or in some cases, instead) be rolled into an electrode using a rolling technique where the cast ingot is rolled using rolling mills (see FIG. 7). If desired, the thickness of the electrode can be successively decreased over multiple passes between the rolling mills until a predetermined desired thickness is achieved. After the rolling, the rolled composite can then be drawn.

Figure 5:
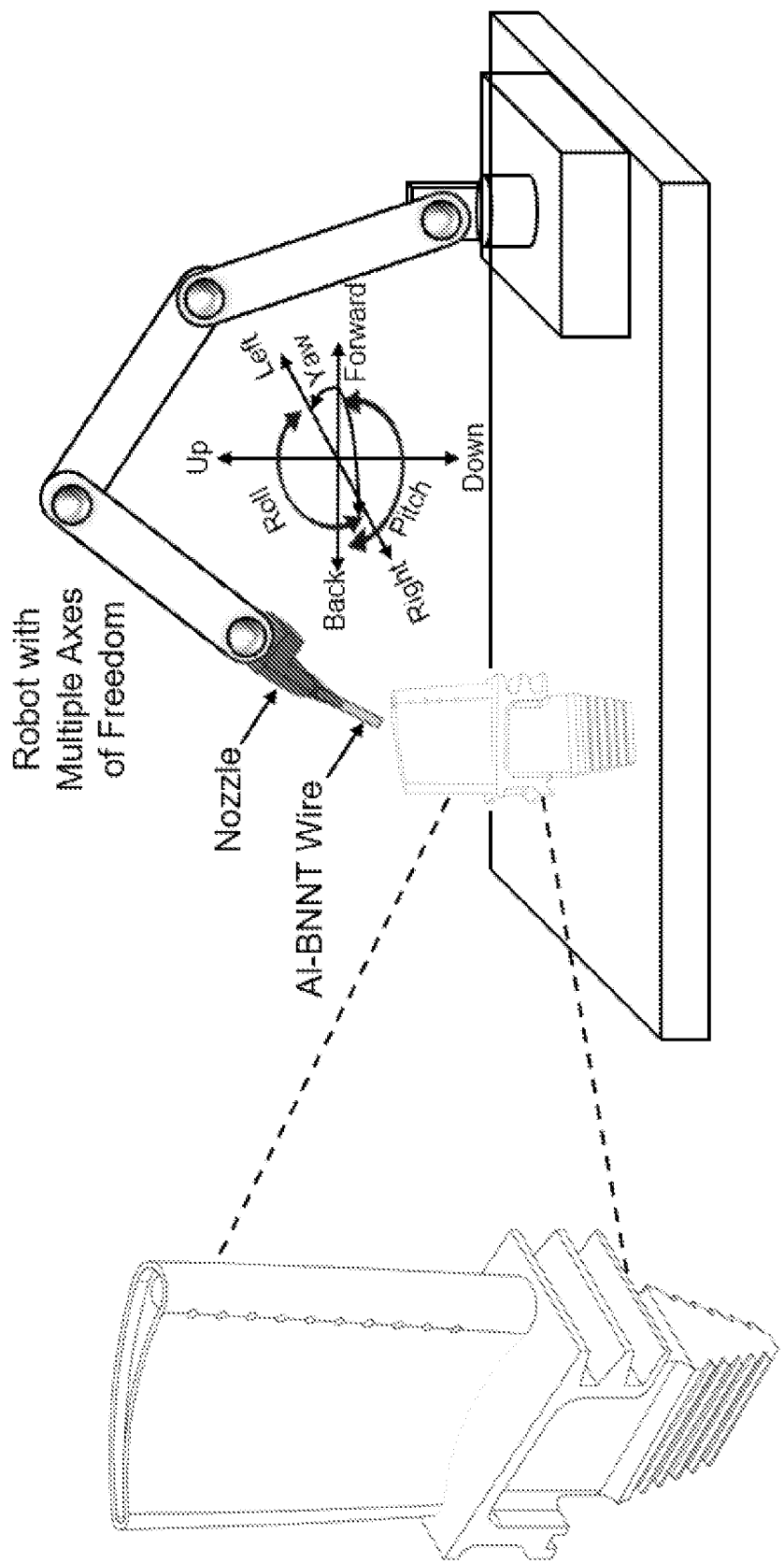
FIG. 5 shows a schematic view of WAAM of high-strength large-size Al—BNNT composites, according to an embodiment of the subject invention.

Embodiments of the subject invention include fabricating high-strength Al—BNNT composites with sizes up to tens of meters by WAAM (see also FIGS. 4 and 9). This process can use the Al—BNNT composite wire and pass it through a nozzle. A high voltage pulse can create an arc discharge at the tip of the nozzle, melt the Al—BNNT composite wire, and deposit it. Referring to FIG. 5, the nozzle can be mounted on a robotic head with multiple independent axes freedom of motion (e.g., 6 or in a range of 3-10 independent axes of motion). The wire-based method can make near full (e.g., 100%, about 100%, greater than 99%, greater than 95%, or greater than 90%) utilization of wire feedstock with low material loss. As a result, aerospace and automotive components with complex geometries and dimensions of the order of tens of meters and a mass of hundreds of kg can be manufactured.

Single-step technology of embodiments of the subject invention eliminates the need for assembly of parts, thus saving time and resource expenditure. The entire Al—BNNT composite can be fabricated as a single monolithic component by WAAM. There is no need for bringing different parts of the composite and assembling them. Post-processing steps such as machining and heat treatment are not necessary. Significant saving of workforce, cost, and time is thus achieved. This also eliminates the need for fastenings such as bolts, solders, and brazing. These fastenings (when present) are typically the weakest links in a manufactured component. Even though a part may be made from high-strength materials, if these fastenings are present it can result in premature failure. The monolithic, WAAM Al—BNNT components of embodiments of the subject invention thus preserve the high strength of the wire feedstock.

Manufacturing techniques of embodiments of the subject invention enable superior flexibility in fabricating lightweight, high-strength components by WAAM. The material systems that this technology can employ include: Al-HEAs, which exhibit higher strength than conventional Al alloys; nanotubes such as BNNT and carbon nanotube (CNT) reinforced composites of 1xxx, 2xxx, 6xxx, 7xxx Al alloys; three-dimensional (3D) particles such as aluminum oxide ($Al_2O_3$) and two-dimensional (2D) lamellae such as hexagonal boron nitride (h-BN) reinforced composites; micro-sized (e.g., $Al_2O_3$) and nano-sized (e.g., silicon carbide (SiC)) particle-reinforced composites; all composites of Al-HEA such as Al-HEA-BNNT, Al-HEA-$Al_2O_3$, Al-HEA-SiC, etc.; and low-density or high-strength metals in addition to Al, such as magnesium and titanium.

Embodiments of the subject invention provide synthesis of high-strength aluminum-BNNT composites by alloying and BNNT reinforcement integration by ultrasonic casting. Embodiments also provide manufacturing of high-strength Al—BNNT wire feedstock by rolling and/or wire drawing and extrusion, fabrication of high-strength Al—BNNT composite components by WAAM with a size on the order of meters and/or a mass on the order of hundreds of kg. The need for assembly and/or fastenings can be inhibited or eliminated by single-step monolithic manufacturing of embodiments of the subject invention.

The present WAAM of monolithic Al—BNNT composites enables components to be fabricated that can carry higher loads while simultaneously reducing the weight of the part. Further, this technology is capable of processing parts with complex geometries in a single step. This is particularly beneficial in components such as rocket propulsion systems and automobile chassis. It is thus attractive to stakeholders in the aerospace and automotive industries. In the immediate future, this technology can be used to manufacture rocket nozzles, aircraft fuselage, hulls of naval vessels, and bodies of armored vehicles.

Raw material Al—BNNT can be synthesized by melting a block of aluminum-containing BNNTs at a temperature in a range of from 660° C.-750° C., ultrasonically treating it at controlled amplitude ranging from 10 micrometers (μm)-30 μm, at a frequency in a range of from 18 kilohertz (kHz)-20 kHz for a period of time in a range of from 10 seconds (s)-120 s, and then cooling it to ambient temperature (see FIGS. 2 and 6). The cast Al—BNNT composite ingot can be pushed into one end of a die (made of, e.g., tungsten, tool steel, or tungsten carbide) at a temperature in a range of from 27° C.-290° C. (0.6 times the melting point ($T_m$) of Al) (cold/hot extrusion/drawing), and then it can be drawn from the other end with a reduced diameter (see FIGS. 3 and 8). This drawing can be repeated multiple times with dies of successively decreasing diameter until the desired final wire diameter is achieved. Prior to the drawing, the cast Al—BNNT composite ingot can be rolled using rolling mills (this can be repeated multiple times to achieve a desired thickness; see also FIG. 7).

Figures 10A, 10B, 10C, 10D:
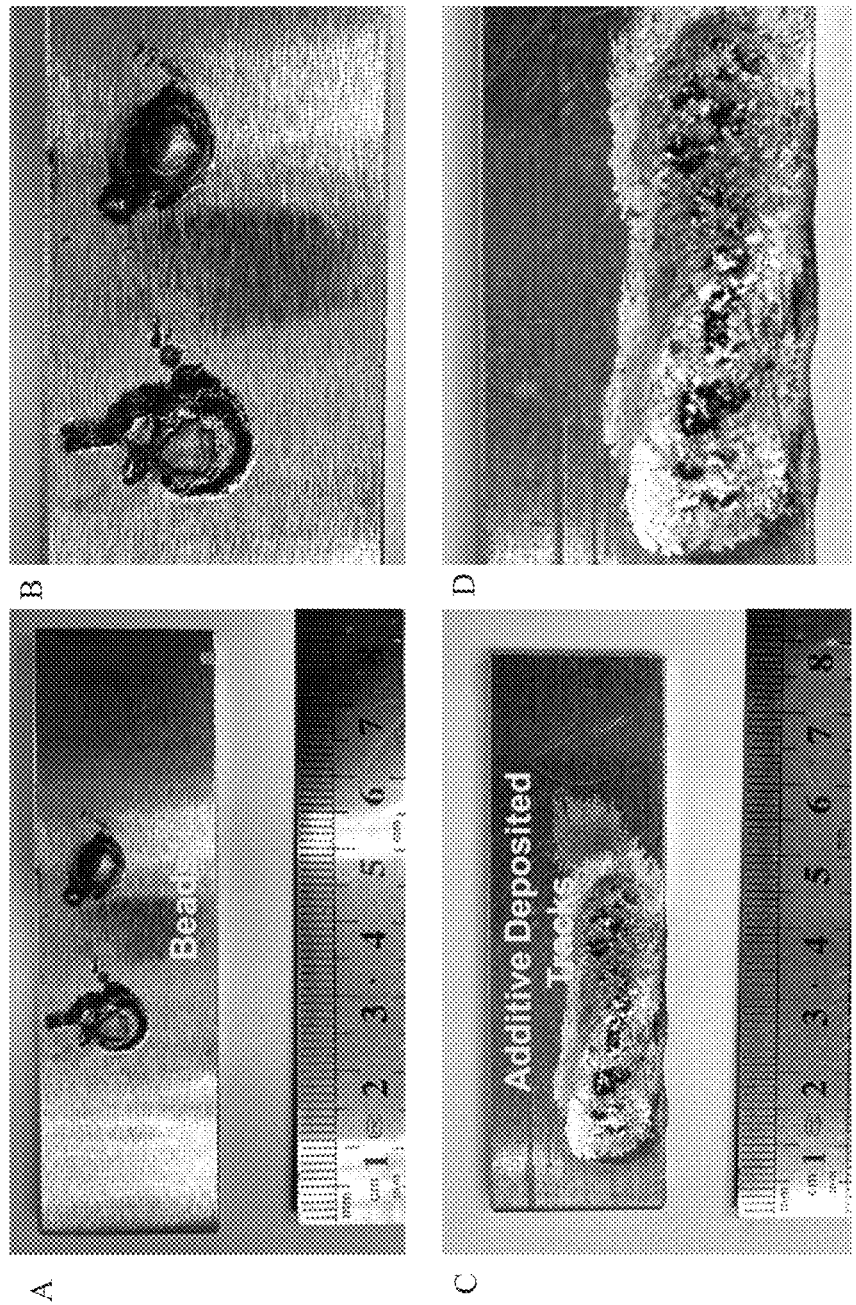
FIGS. 10A-10D show images of deposits of high-strength Al—BNNT composite by WAAM. Controlling the motion span and path of the robot enables deposition of individual beads and additive deposited tracks.
Figures 11A, 11B, 11C, 11D, 11E, 11F, 11G, 11H, 11I:
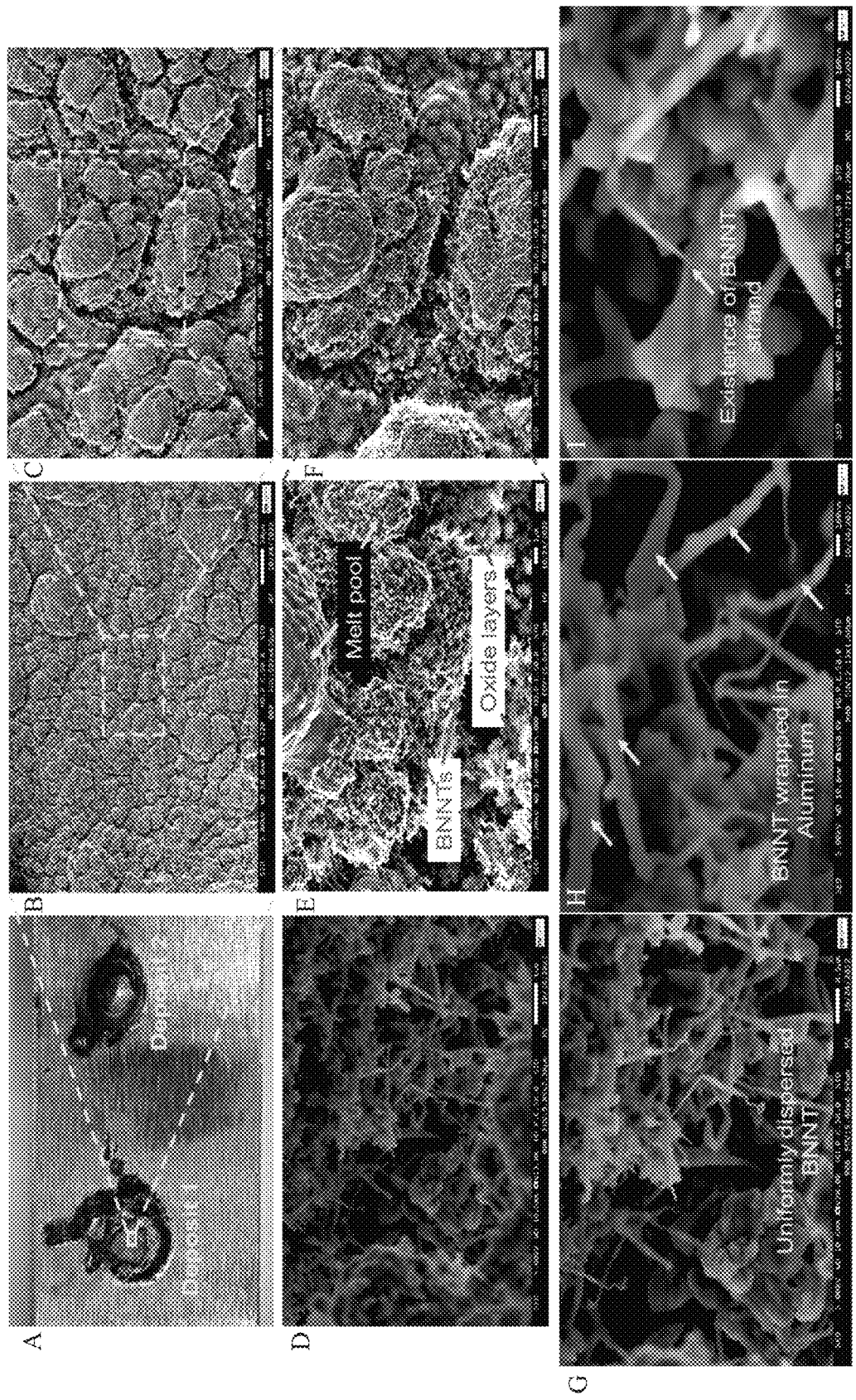
FIGS. 11A-11I show images (scanning electron microscope (SEM) images for FIGS. 11B-11I) of the internal structure of an Al—BNNT composite deposited by WAAM in a first representative location. The composite exhibits characteristic molten and solidified pools of Al and dispersed nanotubes integrated with the Al.
Figures 12A, 12B, 12C, 12D, 12E:
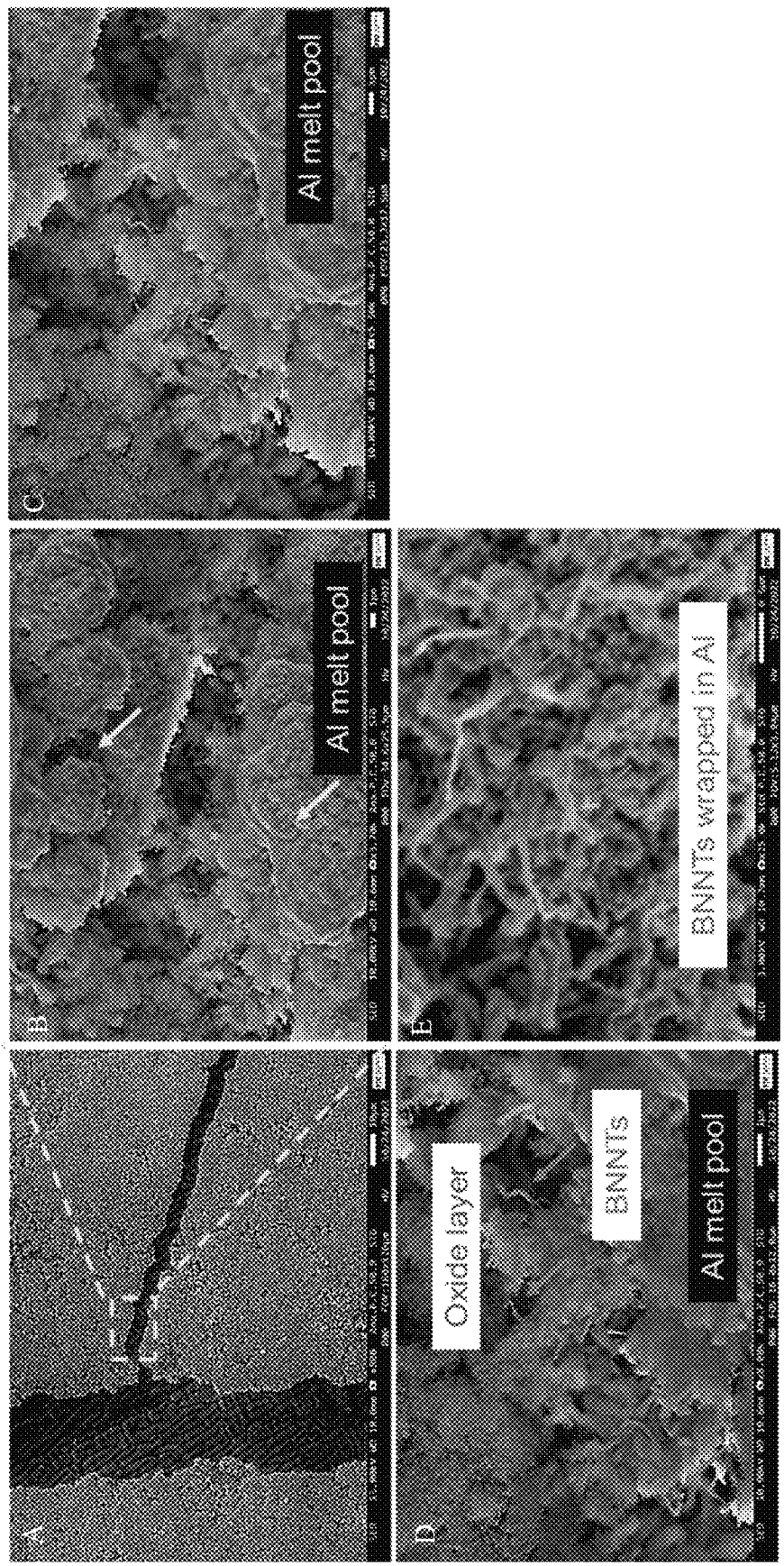
FIGS. 12A-12E show SEM of the internal structure of an Al—BNNT composite deposited by WAAM in a second representative location. The composite exhibits characteristic molten and solidified pools of Al and dispersed nanotubes coated with Al.

The drawn wire can then be fed into a WAAM system mounted on a robot head, and process parameters can be controlled to deposit Al—BNNT (see FIGS. 4, 5, and 9). For example, travel speed, arc voltage, and arc current can be controlled, e.g., in a range of from 5 millimeters per second (mm/s)-30 mm/s, in a range of from 10 Volts (V)-30 V, and in a range of from 70 Amperes (A)-240 A, respectively. The motion span and path of the robot can be controlled to yield the desired geometry of the Al—BNNT composite component. For example, the composite component can be formed as individual beads (see FIGS. 10A and 10B) or additive deposited tracks (see FIGS. 10C and 10D). The deposited composite can include molten pools (Al pools) characteristic of the additive manufacturing process and can include BNNTs dispersed (e.g., uniformly dispersed or mostly uniformly (e.g., at least 95% uniformly) dispersed) and integrated with the metal (see also FIGS. 11A-11I and 12A-12E).

Embodiments of the subject invention can also be advantageous in manufacturing plant logistics and combustion systems. Currently, plants that manufacture large-scale parts need to construct tools and assembly units to integrate more than a thousand rocket components by fastenings. The single-step manufacturing of embodiments of the subject invention can inhibit or eliminate the necessity for these assembly units and reduce manufacturing time and logistics of a plant from years to months. Also, propulsion systems in automobiles, aircraft, and rockets require many parts for fluid intake, injection, spraying, combustion, and exhaust. Currently, these are manufactured individually and joined together. Embodiments of the subject invention can manufacture all parts together in one run.

Embodiments of the subject invention have certain features in common with U.S. Pat. Nos. 10,941,464, 10,947,607, 11,148,201, and 11,491,569 all of which are hereby incorporated by reference in their entireties.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

Raw material Al—BNNT was synthesized by melting a block of aluminum-containing BNNTs at a temperature in a range of from 660° C.-750° C., ultrasonically treating it at controlled amplitude ranging from 10 μm-30 μm, at a frequency in a range of from 18 kHz-20 kHz for a period of time in a range of from 10 seconds (s)-120 s, and then cooling it to ambient temperature (see FIGS. 2 and 6). The cast Al—BNNT composite ingot was pushed into one end of a die (made of tungsten, tool steel, or tungsten carbide) at a temperature in a range of from 27° C.-290° C. (0.6 times the melting point ($T_m$) of Al) (cold/hot extrusion/drawing), and then it was drawn from the other end with a reduced diameter (see FIGS. 3 and 8). This drawing can be repeated multiple times with dies of successively decreasing diameter.

The drawn wire was then fed into a WAAM system mounted on a robot head, and process parameters were controlled to deposit Al—BNNT (see FIGS. 4, 5, and 9). For example, travel speed, arc voltage, and arc current can be controlled in a range of from 5 mm/s-30 mm/s, in a range of from 10 V-30 V, and 70 in a range of from A-240 A, respectively. The motion span and path of the robot can be controlled to yield the desired geometry of the Al—BNNT composite component.

EXAMPLE 2

Raw material Al—BNNT was synthesized by melting a block of aluminum-containing BNNTs at a temperature in a range of from 660° C.-750° C., ultrasonically treating it at controlled amplitude ranging from 10 μm-30 μm, at a frequency in a range of from 18 kHz-20 kHz for a period of time in a range of from 10 seconds (s)-120 s, and then cooling it to ambient temperature (see FIGS. 2 and 6). The cast Al—BNNT composite ingot was rolled through rolling mills multiple times (see FIG. 7) and then pushed into one end of a die (made of tungsten, tool steel, or tungsten carbide) at a temperature in a range of from 27° C.-290° C.

Figure 3:
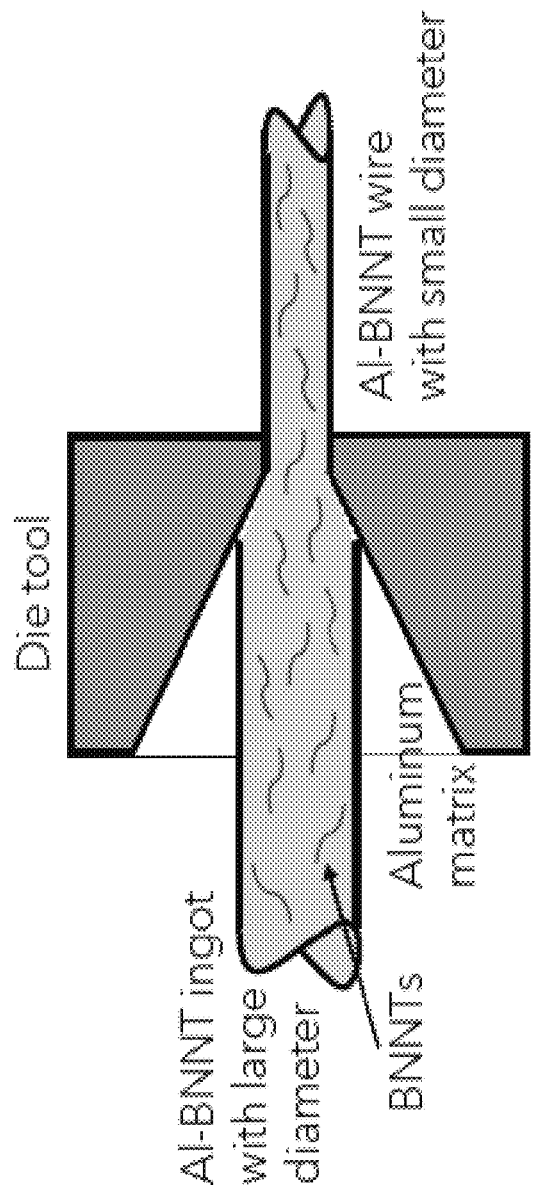
FIG. 3 shows a cross-sectional view of drawing and extrusion of an Al—BNNT wire, according to an embodiment of the subject invention, for manufacturing of high-strength Al—BNNT wire feedstock.
Figure 8:
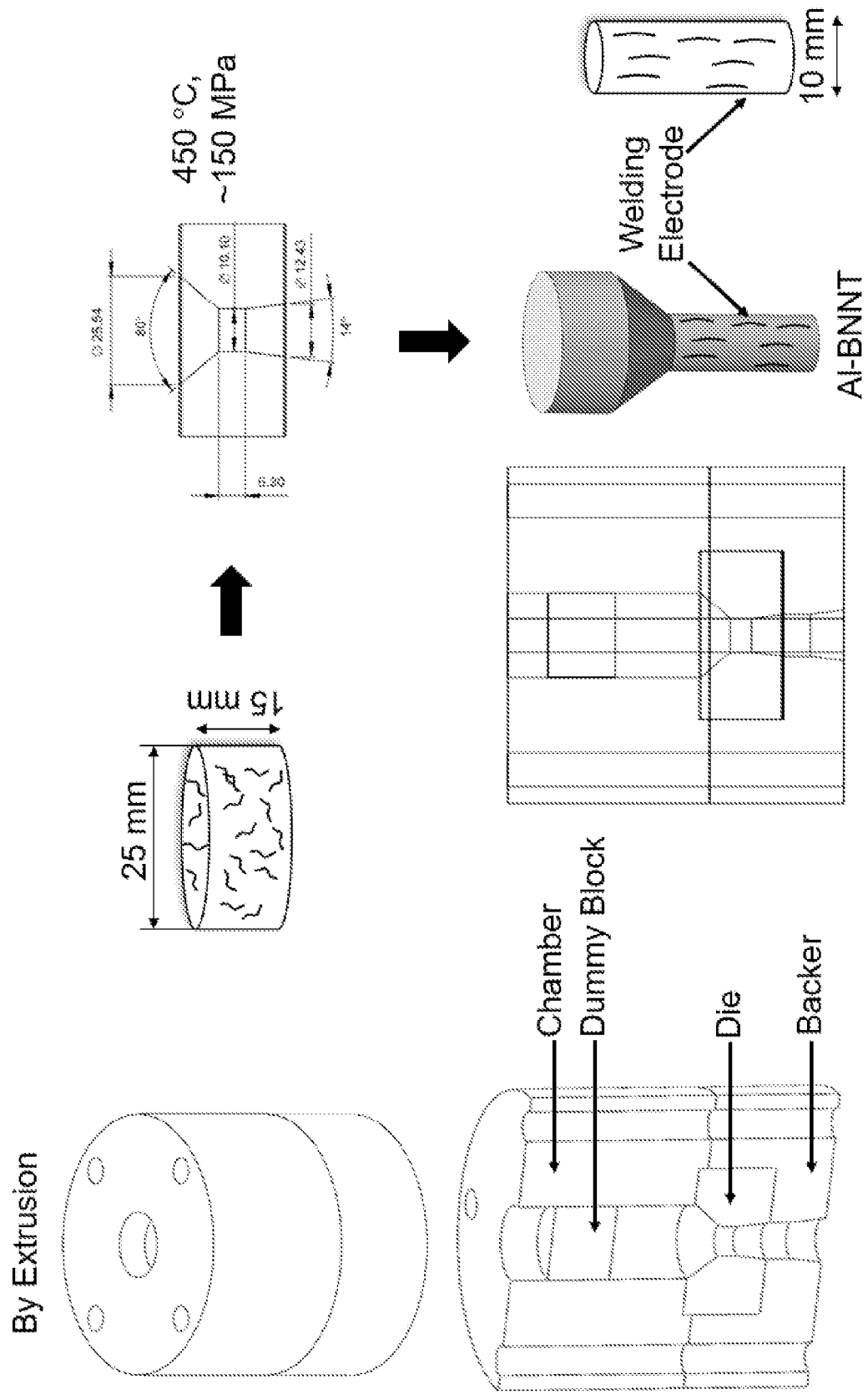
FIG. 8 shows a diagram of a method of fabricating high-strength Al—BNNT electrode feedstock by an extrusion technique, according to an embodiment of the subject invention. The diameter of the electrode can be successively reduced to a desired diameter by multiple passes through the extrusion die tool. Though

(0.6 times the melting point ($T_m$) of Al) (cold/hot extrusion/drawing), and then it was drawn from the other end with a reduced diameter (see FIGS. 3 and 8). This drawing was repeated multiple times with dies of successively decreasing diameter.

The drawn wire was then fed into a WAAM system mounted on a robot head, and process parameters were controlled to deposit Al—BNNT (see FIGS. 4, 5, and 9). Travel speed, arc voltage, and arc current were controlled in a range of from 5 mm/s-30 mm/s, in a range of from 10 V-30 V, and 70 in a range of from A-240 A, respectively. The motion span and path of the robot can be controlled to yield the desired geometry of the Al—BNNT composite component. The composite component was formed as individual beads (see FIGS. 10A and 10B) and then was formed as additive deposited tracks (see FIGS. 10C and 10D). The deposited beads included molten pools (Al pools) characteristic of the additive manufacturing process and also included BNNTs uniformly dispersed (or mostly uniformly dispersed) and integrated with the Al, as seen in FIGS. 11A-11I and 12A-12E.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including in the "References" section, if any) are incorporated by reference in their entirety, including all figures and tables, to the extent they are not inconsistent with the explicit teachings of this specification.

What is claimed is:

1. A method for fabricating an aluminum-boron nitride nanotube (Al—BNNT) composite, the method comprising:
    preparing an Al—BNNT ingot including ultrasonically treating a mixture of Al and BNNTs;
    performing an extrusion and drawing process on the Al—BNNT ingot to form an Al—BNNT wire; and
    forming the Al—BNNT composite via a wire-arc additive manufacturing (WAAM) process using the Al—BNNT wire as a feedstock for a WAAM system,
    the extrusion and drawing process comprising pushing the Al—BNNT ingot through a plurality of dies of progressively smaller diameters to successively decrease a diameter of the Al—BNNT ingot.

2. The method according to claim 1, the WAAM system comprising a nozzle attached to a robotic arm.

3. The method according to claim 2, the robotic arm being configured to move along or rotate about a number of axes, the number of axes being at least three.

4. The method according to claim 3, the number of axes being at least six.

5. The method according to claim 1, the preparing of the Al—BNNT ingot comprising ultrasonically treating the mixture of Al and BNNTs to form an Al—BNNT powder, compacting the Al—BNNT powder into Al—BNNT pellets, melting the Al—BNNT pellets together with Al to form a melted block, and then cooling the melted block to form the Al—BNNT ingot.

6. The method according to claim 1, the WAAM process comprising controlling travel speed in a range of from 5 millimeters per second (mm/s) to 30 mm/s, controlling arc voltage in a range of from 10 Volts (V) to 30 V, and controlling arc current in a range of from 70 Amperes (A) to 240 A using the WAAM system.

7. The method according to claim 1, further comprising performing a rolling process on the Al—BNNT ingot before performing the extrusion and drawing process.

8. The method according to claim 7, the rolling process comprising passing the Al—BNNT ingot through a pair of rolling mills at least once to decrease a thickness of the Al—BNNT ingot.

9. The method according to claim 1, the mixture of Al and BNNTs comprising an Al-containing powder and BNNTs in a solvent.

10. The method according to claim 9, the solvent being an alcohol.

11. The method according to claim 9, the Al-containing powder comprising an Al alloy.

12. An Al—BNNT composite fabricated by the method according to claim 1, the Al—BNNT composite having a length of at least 1 meter and a mass of at least 100 kilograms, and the Al—BNNT composite being a single, monolithic structure.

13. The Al—BNNT composite according to claim 12, the Al—BNNT composite being free of any fasteners.

14. The Al—BNNT composite according to claim 12, the Al—BNNT composite having a thickness of at least 20 centimeters.

15. An Al—BNNT composite having a length of at least 1 meter and a mass of at least 100 kilograms, the Al—BNNT composite being a single, monolithic structure.

16. The Al—BNNT composite according to claim 15, the Al—BNNT composite being free of any fasteners.

17. The Al—BNNT composite according to claim 15, the Al—BNNT composite having a thickness of at least 20 centimeters.

18. A method for fabricating an aluminum-boron nitride nanotube (Al—BNNT) composite, the method comprising:
    preparing an Al—BNNT ingot including ultrasonically treating a mixture of Al and BNNTs;
    performing a rolling process on the Al—BNNT ingot to form a rolled Al—BNNT ingot;
    performing an extrusion and drawing process on the rolled Al—BNNT ingot to form an Al—BNNT wire; and
    forming the Al—BNNT composite via a wire-arc additive manufacturing (WAAM) process using the Al—BNNT wire as a feedstock for a WAAM system,
    the WAAM system comprising a nozzle attached to a robotic arm,
    the robotic arm being configured to move along or rotate about a number of axes, the number of axes being at least six,
    the preparing of the Al—BNNT ingot comprising ultrasonically treating the mixture of Al and BNNTs to form an Al—BNNT powder, compacting the Al—BNNT powder into Al—BNNT pellets, melting the Al—BNNT pellets together with Al to form a melted block, and then cooling the melted block to form the Al—BNNT ingot,
    the WAAM process comprising controlling travel speed in a range of from 5 millimeters per second (mm/s) to 30 mm/s, controlling arc voltage in a range of from 10 Volts (V) to 30 V, and controlling arc current in a range of from 70 Amperes (A) to 240 A using the WAAM system,
    the extrusion and drawing process comprising pushing the rolled Al—BNNT ingot through a plurality of dies of progressively smaller diameters to successively decrease a diameter of the rolled Al—BNNT ingot, the rolling process comprising passing the Al—BNNT ingot through a pair of rolling mills at least once to decrease a thickness of the Al—BNNT ingot, the mixture of Al and BNNTs comprising an Al-containing powder and BNNTs in a solvent.

19. An Al—BNNT composite fabricated by the method according to claim 18, the Al—BNNT composite having a length of at least 1 meter and a mass of at least 100 kilograms, the Al—BNNT composite being a single, monolithic structure, the Al—BNNT composite being free of any fasteners, and the Al—BNNT composite having a thickness of at least 20 centimeters.

* * * * *